(No Model.)

J. SHERMAN
NUT LOCK.

No. 256,169.  Patented Apr. 11, 1882.

Witness,
M. G. Norton
James A. Marsh

Inventor,
John Sherman
By Geo. W. Tibbitts, Atty.

UNITED STATES PATENT OFFICE.

JOHN SHERMAN, OF CLEVELAND, OHIO.

NUT-LOCK.

SPECIFICATION forming part of Letters Patent No. 256,169, dated April 11, 1882.

Application filed February 8, 1882. (No model.)

*To all whom it may concern:*

Be it known that I, JOHN SHERMAN, of Cleveland, in the county of Cuyahoga and State of Ohio, have invented a new and useful Improvement in Lock-Nuts, of which the following is a specification.

The nature and objects of this invention will fully appear from the subjoined description, when considered in connection with the accompanying drawings, in which—

Figure 2:
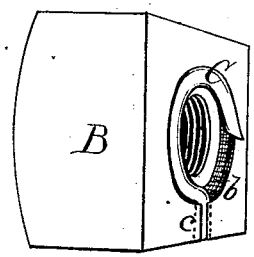
Figure 3:
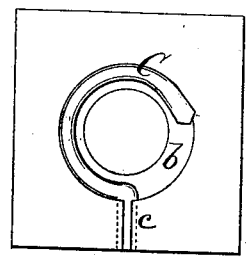
Figure 4:
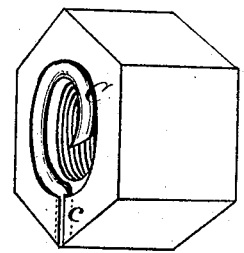
Figure 1:
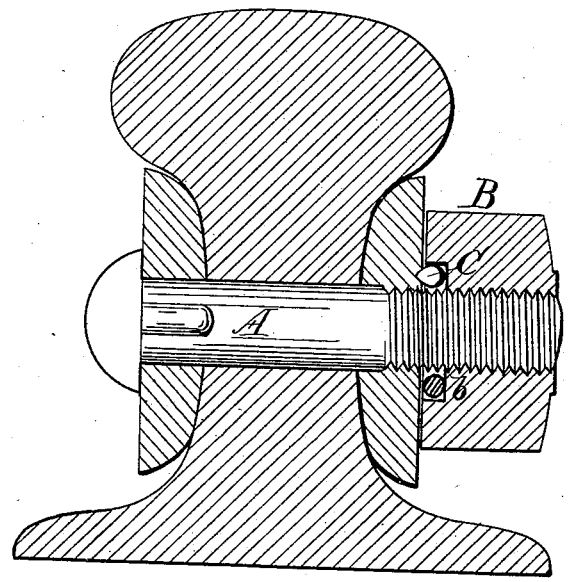

Figure 1 is a sectional view of a bolt and nut containing my improvement. Figs. 2, 3, and 4 are views of nuts having my improvement attached.

This improvement is designed for railway-rail bolts, but is applicable to other uses as well.

A is a bolt such as is employed in coupling rails.

B is a nut, which is made in the usual form and manner. In the inside face of said nut I make an annular groove or rabbet, *b*. This rabbet can be made when the hole is punched in the nut, the punching-die being formed for that purpose.

C is a curved spring pawl or dog lying in said rabbet, is secured in one side of the nut at *c*, and reaches about three-fourths the way round, and has its free end bent outward so as to project beyond the face of the nut, and the end is also sharpened for the purpose of making it catch into the fish-plate. The pawl C is made of steel wire, and serves to prevent the backward turn of the nut by jarring.

From the foregoing it will be seen that with this pawl attachment the nut may be turned up tight to the required degree, and that it will be held securely in that position by the pawl and cannot turn back. When it is desired to remove the nut considerable power is required, and the pawl is liable to be broken, or else the pawl will cut a circular groove in the fish-plate; but the removal of nuts from railway-rails is seldom required, and then only in case of repair in replacing broken or worn-out rails, in which case new fish-plates, bolts, and nuts are also used.

The object of this invention is to supply a simple, effectual, and ready means of preventing the loosening of nuts on railway-rails. This is accomplished at a trifling cost above the common nuts by my improvement.

Having described my invention, I claim—

In a nut-lock, the combination, with the nut B, having a shallow rabbet, *b*, of the spring pawl or dog C, consisting of a single coil of wire extending partially around the rabbet, sharpened at one end and fastened at the other end in a slot, *c*, the latter extending from the bolt-hole to the outer edge of the nut.

JOHN SHERMAN.

Witnesses:
GEO. W. TIBBITTS,
M. G. NORTON.